June 4, 1963  O. P. SATHER  3,092,577

PRESSURE LIQUID FILTERING DEVICE

Filed Jan. 27, 1960  2 Sheets-Sheet 1

INVENTOR
OLAF P. SATHER
BY Williamson, Schroeder & Palmatier
ATTORNEYS

June 4, 1963  O. P. SATHER  3,092,577
PRESSURE LIQUID FILTERING DEVICE
Filed Jan. 27, 1960  2 Sheets-Sheet 2

INVENTOR
OLAF P. SATHER
BY
Williamson, Schroeder & Palmatier
ATTORNEYS

United States Patent Office 3,092,577
Patented June 4, 1963

3,092,577
PRESSURE LIQUID FILTERING DEVICE
Olaf P. Sather, Duluth, Minn., assignor to Duluth Filter Company, Duluth, Minn., a corporation of Minnesota
Filed Jan. 27, 1960, Ser. No. 4,905
3 Claims. (Cl. 210—232)

This invention relates to pressure liquid filtering devices. More particularly, it relates to filtering devices for filtering liquids which are forced through the device while under pressure as is the case in diesel engines, etc., wherein large quantities of oil or similar fluids must be filtered before being used or reused. This invention relates especially to the type of filter wherein it is necessary or at least desirable that the filter media be readily disposable and removable after its useful life span has terminated.

In the filtering of oil and other fluids which are used in connection with the operation of diesel motors and the like, it is conventional for the oil to be forced under pressure into a substantially closed container commonly referred to as a shell. Such a shell is provided with an inlet and one or more outlets which in turn are connected to the part of the motor which is to again use the oil after it has been filtered. It is conventional for such a shell to utilize a plurality of separate filters, one each for each outlet. It is also conventional for such filters to be superimposed on the outlet and connected thereto in such a way that the oil or other liquid is forced through the filter by the pressure applied thereto and into a central core which is connected to the outlet in fluid-communicating relation. The most commonly used and generally accepted means which has been used heretofore has included the utilization of a cylindrical screen or perforated basket which has a closed top and bottom with an outlet in the bottom adapted to engage and seat upon one of the shell outlets in fluid-communicating relation. The walls of the cylindrical basket or screen are perforated with thousands of small orifices or openings through which the oil may enter the interior of the basket. Such baskets are generally provided with an upstanding rod member that extends longitudinally of the basket and through the top plate thereof. The upper end of such a rod generally has a reduced tip which extends into an index opening in an index member rigidly supported by a plurality of upstanding rods within the interior of the shell. Such an index member is commonly in the form of a plate and this plate serves to position the basket and press it downwardly upon the outlet of the shell but does not prevent by passing of the liquids at the upper end of the interior of the baskets. Such a central rod or core member extending upwardly through the basket is normally provided with openings or oil passageways so that the oil after it has passed through the screen and the filtering media within the screen or basket, may pass downwardly into the outlet of the shell. From this it will be readily appreciated that the filtering media is packed between the central rod and the screen or basket so that as the oil passes inwardly through the screen or basket, it must pass through the filtering media before it reaches the shell outlet.

Such cylindrical screens or baskets present a number of problems and disadvantages. One disadvantage of such baskets is the intial cost of the same. These baskets must be manufactured of quite costly material, such as metal, and in view of their perforated nature and rigid construction, their cost is far from inexpensive. In addition, the use of such baskets involves the cost of replacement, for it has been found through experience that if such a basket can be used for a period exceeding one year, the user is indeed fortunate because of the likelihood of such baskets becoming malformed through use. Such baskets dent easily and soon become deformed to such an extent that they cannot be reused. In this connection, it will be noted that through the use of such baskets, it becomes necessary that the baskets and the central core be washed thoroughly whenever the filtering media is changed. Such washing requires considerable time an effort and, in addition, frequently is the means whereby such baskets become damaged and deformed. Still another disadvantage involved in the use of such baskets is that it is extremely difficult to remove the filtering media from therewithin, for such filtering media tends to become closely packed as the result of use of the filter. Even more serious is the fact that the oil becomes stiff when cold and under such conditions, it is extremely difficult to remove the filtering media from the basket. My invention is designed to obviate each of these disadvantages and to provide at the same time a more efficient filter.

One disadvantage of packing such a filter as described above with a filtering media is that when the media is placed within the basket in the manner described, it is common for "channeling" to take place. "Channeling" is a phenomenon commonly referred to when the oil or liquid to be filtered establishes one or more very definite channels through which the oil passes without any filtering taking place, while the bulk of the filtering media serves no filtering purpose whatever as a result of such by-passing of that portion of the media. My invention includes the provision of a filter constructed in a novel manner so as to tend to eliminate or at least substantially reduce the tendency toward "channeling."

It is a general object of my invention to provide a novel and improved pressure liquid filtering device which is simple and inexpensive in construction and operation.

A more specific object is to provide a novel pressure liquid filtering device which will effect a substantial saving in labor, initial cost, and maintenance.

Another object is to provide a novel pressure liquid filtering device which will filter in a more efficient manner and which is completely and quickly disposable when the filter media is to be discarded.

Another object is to provide a pressure liquid filtering device which can be produced at a substantial saving in manufacturing cost and which will greatly facilitate the substitution of a new filtering media when such substitution is required.

Another object is to provide a pressure liquid filtering device so constructed as to obviate the need for washing a core and basket member, which will facilitate the removal of the filtering media, which will eliminate the cost of replacement of basket members, and which will substantially reduce the initial cost of installation of the filtering media.

Another object is to provide a novel pressure liquid filtering device which can be readily substituted in presently used filtering shells in lieu of the conventional equipment heretofore used and at a substantial saving thereover, while at the same time providing an improved filtering function.

These and other objects and advantages of my invention will more fully appear from the following description made in connection with the accompanying drawings wherein like reference characters refer to similar parts throughout the several views and in which.

Figure 1:
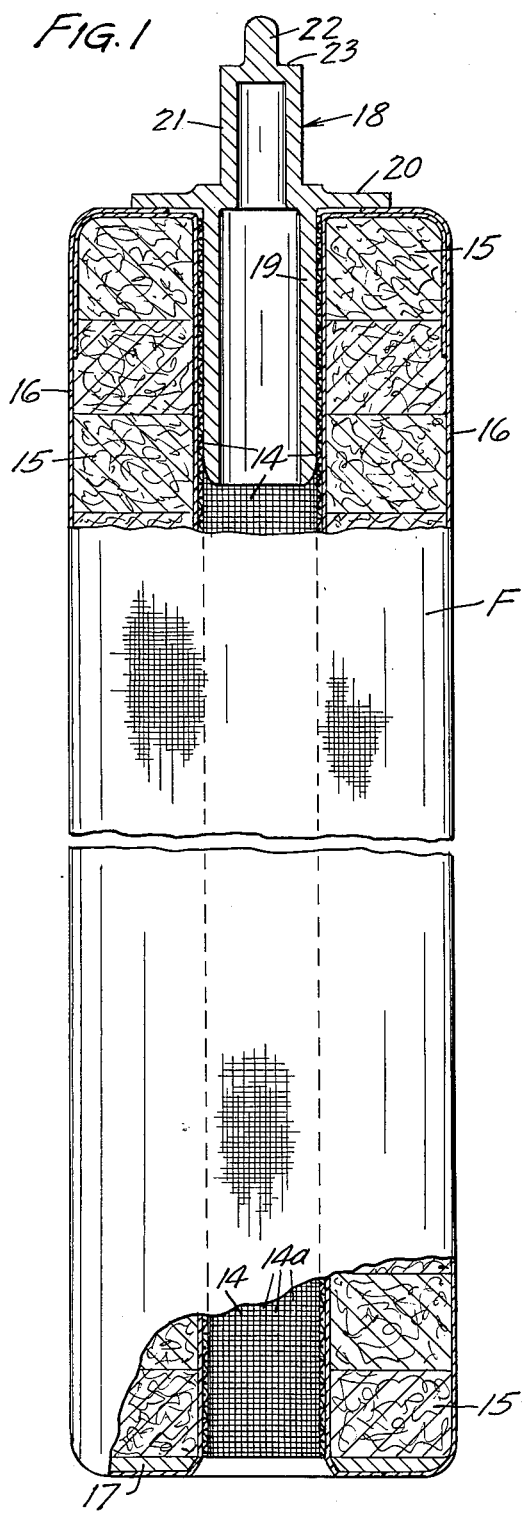
FIG. 1 is a side-elevational view of one of my improved filters and my indexing plug with portions thereof broken away and shown in section to more clearly illustrate the construction thereof.
Figure 2:
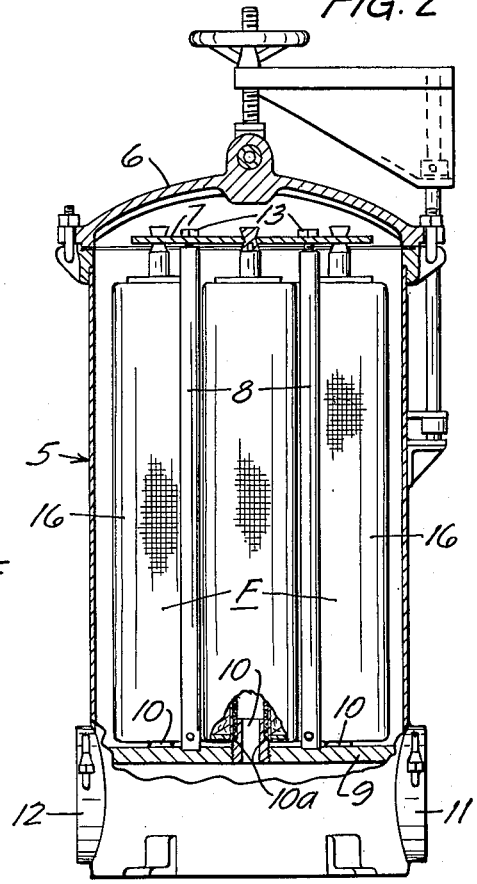
FIG. 2 is a vertical sectional view on a reduced scale of a conventional filtering shell, with its conventional index member having one of my improved filters substituted therein in lieu of the conventional basket-type construction filter.
Figure 3:
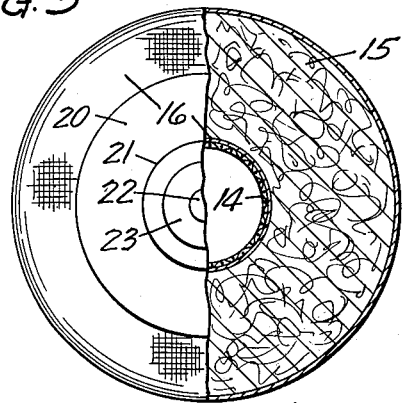
FIG. 3 is a top elevational view of my filter shown in FIG. 2 with portions thereof broken away to better illustrate the construction thereof.

FIG. 2 shows a filtering shell indicated generally by the numeral 5 having a cover member 6 and an index member 7 supported by a plurality of upstanding rods 8 which are disposed within the interior of the shell and are rigidly secured to the bottom 9 thereof. It will be noted that there is formed in the bottom 9 of the shell a plurality of oil outlets each indicated by the numeral 10 and it is conventional in such construction to have one filter basket superimposed over each of these outlets. For the sake of clarity, a filtering device is shown applied to one outlet 10 so that the device may be viewed in elevation. The shell 5 is provided with an oil inlet 11 through which oil is forced under pressure by the conventional diesel motor (not shown). A master outlet 12 which is connected to each of the outlets 10 is also provided for the shell. The master inlet 11 is connected with the interior of the shell 5 in a manner well known in the art but not illustrated in FIG. 1.

Each of the rods 8 is provided with a tightening screw 13 at its upper end by means of which the index member 7 may be caused to bear and press downwardly upon the separate filtering means which are superimposed upon the various outlets 10. In this manner, pressure may be applied from above to insure that the filtering means will be pressed downwardly upon the portion of the shell 5 which defines the outlet 10 to preclude the oil from by-passing the filtering means and escaping through the outlet 10.

The construction defined above is conventional in the filtering of oil in diesel motors. In addition to this construction, there is generally utilized the basket filled with a filtering media as described hereinbefore. I have discovered however, that it is possible to eliminate the use of such a filtering basket and the substantially solid central core which extends upwardly therethrough to engage the index member 7. I have found that if I construct a filter having an elongated central porous core member 14 of rigid material such as heavy screen wire, such a core member will preclude longitudinal compressibility of the filter. To this core member 14 I apply a plurality of filter disks or other filtering media 15 which I form out of filtering media consisting of relatively long wood fibers and relatively short gun cotton fibers. These disks 15 I apply to the rigid core member 14 which, because of the nature of the material from which it is made, is porous or perforated so that oil, may readily pass therethrough. I also apply a sock or bag 16 to the disks 15 of filtering media so as to hold these disks of the filtering media in filtering position over the openings 14a of the central core member 14. The bag 16 is preferably formed of a porous fabric material and is applied to the inner surfaces as well as the outer surfaces of the disks 15. Reference to FIG. 2 will show that the bag 16 extends between the wire core 14 and the interior surfaces defining the openings in the disks 15 and also extends outwardly along the underside of the lower disks 15 and upwardly along the outer surfaces of each of the disks 15 and is tied or similarly secured at the end of the plurality of disks so as to insure that the sock or bag member 16 cannot become loosened. In other words, a closing flap extends down over the outside of the upper disks 15 and is overlapped on the outside by the upper portion of the bag to ensure that all the disks 15 are enclosed. I also provide an oil proof fiber composition ring member 17 at the bottom of the filter to prevent distortion of the lower end of the cartridge or filter and a resultant poor seal around the oil outlet 10. In this connection it will be noted that the portion of the bottom 9 of the shell 5 which defines the outlet openings 10 is beveled as at 10a. This beveled seat aids in insuring a good seal between the filtering means and the portions which define the outlets 10.

Reference to FIG. 1 shows that the core member 14 is manufactured with each of its ends open. I have provided an indexing plug indicated generally by the numeral 18 to obviate the need for the substantially solid upstanding central core member heretofore used in the basket structures hereinbefore described. The plug indexing member 18 has a cylindrically shaped imperforate plug portion 19 which is adapted to extend downwardly into the upper end of the core 14 as best shown in FIG. 2. This plug member 19 precludes the entrance of oil through the top of the filter and thereby by-passing the filter. Secured to the plug member 19 at its upper end is an annular flange member 20 which extends radially outwardly from the upper end of the plug portion 19. An upstanding element 21 extends upwardly from the flange 20 and is provided with a reduced tip 22 at the extreme upper end, the formation of this tip resulting in a shoulder 23 which is adapted to bear against the plate 7 when this filtering means is inserted in the conventional construction.

In use, the filtering means shown in FIG. 2 is inserted in the conventional shell 5 as shown in FIG. 1 with the lower end thereof perfecting a seal against the beveled portion 10a of the material of the bottom 9 of the shell which defines the opening 10. The plug portion 19 of the plug indexing member 18 is then inserted in the upper end of the core 14 and pressed downwardly until the annular flange 20 bears against the upper end of the bag 16 and the various filtering disks 15. The reduced tip 22 is then inserted into the indexing member 7 in the openings provided within that member for receiving the substantially solid core of the baskets heretofore used. The screws 13 are then tightened to cause the indexing member 7 to bear against the shoulder 23 and press the filtering means downwardly in sealed relation to the beveled seat 10a. When the cover member 6 is tightened, the filtering device is ready for use.

When the filter shown in FIG. 2 has been used for a sufficiently long period such that it must be replaced, this replacement is an extremely simple matter. The plug indexing member 18 is merely removed from the index member 7 and from the upper end of the filter which is indicated generally by the letter F. This filter F can be discarded in its entirety without any substantial loss and a new filter F substituted therefor. It will be readily appreciated that this change of filter can be effected at a substantial saving of time and effort, for there is no washing of parts required and the removal thereof is an extremely simple matter as compared to the laborious extraction of filtering media from a basket as heretofore practiced. It should be noted that the filter F does not require any metal flanges or spool construction at the ends thereof, so that the filters F may be manufactured at a very substantial reduction in cost. The indexing plug 18 can, of course, be reused as long as desired and may be merely applied to a new filter F when the filtering media must be changed.

The use of my new pressure liquid filtering device substantially reduces the initial cost as well as the cost of maintenance. In addition, there is a substantial saving in the amount of time and labor required to effect a change of the filtering media. I have found that this type of construction is readily accepted and desired by owners of diesel engines.

Figure 4:
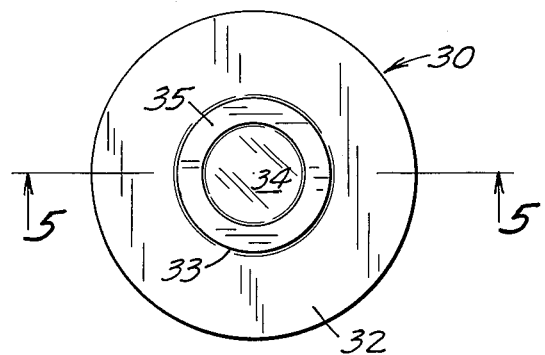
FIG. 4 is a plan view of an alternative form of indexing plug which may be used.
Figure 5:
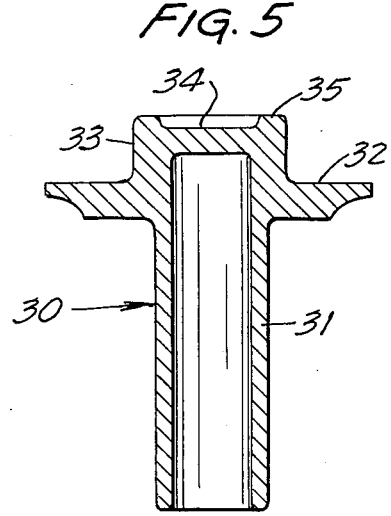
FIG. 5 is a vertical sectional view taken along line 5—5 of FIG. 4.

FIGS. 4 and 5 show a second form of indexing plug indicated generally by the numeral 30. It has, as shown, a cylindrically shaped imperforate plug portion 31 which is adapted to extend downwardly into the upper end of the core 14 in a manner similar to that shown in FIG. 1. This plug member 31 precludes the entrance of oil through the top of the filter and thereby by-passing the filter. Secured to the plug member 31 at its upper end is an annular flange member 32 which extends radially outwardly from the upper end of the plug portion 31. An upstanding element 33 extends upwardly from the flange 32 and is provided with a concaved upper surface 34 surrounded by an annular upwardly extending shoulder element 35, which defines a type of socket which may be used to cooperate with a downwardly extending peg on an indexing plate (not shown) to properly index and hold the filter unit in proper position. It is believed readily understandable how the plug 30 may be used in lieu of the plug 18 when desired with such a modified indexing plate.

It should also be noted that the filtering media which I utilize is in the form of a plurality of disks 15. I have found that by forming the filtering media in the shape of disks 15 I can greatly simplify the insertion of the filtering media within the bag 16 and its application to the core member 14. In addition, I have found that by so forming the filtering media, I have substantially eliminated or at least greatly reduced the tendency toward "channeling" which has heretofore been experienced in filter medias packed within wire baskets and in prefabricated cartridges.

It will, of course, be understood that various changes may be made in the form, details, arrangement and proportions of the parts without departing from the scope of my invention.

What is claimed is:

1. In a pressure liquid filtering device having a substantially closed shell having liquid outlet and a liquid inlet connected to a source of liquid under pressure and an indexing member within the shell extending thereacross and having engageable means for operatively positioning a filter element in working relationship, said filter element comprising: an elongated substantially uncompressible hollow core member having open ends, one of which is adaptable to be connected to such a liquid outlet in liquid-transmitting relation, said core member having openings therein bringing the interior of said shell into fluid-communicating relation with such liquid outlet when so connected, hollow circumferentially continuous filtering media concentrically surrounding the openings of said core member; a porous bag member enveloping said filtering media and securing and holding said filtering media in axially abutting and snug-fitting relation with a portion of the bag member disposed in close fitting relationship between said filtering media and the other surface of said core member, one end of said bag comprising a closing flap extending around one end of the filtering media with the other end of said bag overlapping said closing flap and extending radially inwardly over the one end of the filtering media, and an imperforate indexing plug having a cylinder shaped element slidably extending in non-threading relation into the end of said core member which is adjacent said one end of the filtering media and having an annular flange element formed near one end of the cylinder-shaped element bearing against said other end of the porous bag member and said filtering media thereunder whereby the flange frictionally holds the ends of the bag against the filtering media, said indexing plug having axially disposed engaging means cooperatively engaging the engageable means of the indexing member when said core member is so connected to such outlet to hold said core member in fluid communicating relation with said liquid outlet.

2. The structure as defined in claim 1 including: an oil proof ring member concentrically arranged and disposed at the end of said core member which is adapted to be connected to such liquid outlet, said oil proof ring member having a beveled seat concentrically formed therein in liquid sealing relationship with such liquid outlet and being enveloped along with said filtering media by said porous bag member.

3. The structure as defined in claim 1, wherein said filtering media is arranged in the form of a plurality of radially extending equal diameter disks surrounding said core member.

References Cited in the file of this patent

UNITED STATES PATENTS

| | | |
|---|---|---|
| 2,301,121 | Kamrath | Nov. 3, 1942 |
| 2,407,046 | Vokes | Sept. 3, 1946 |
| 2,507,125 | Townsend | May 9, 1950 |
| 2,545,374 | Nugent | Mar. 13, 1951 |
| 2,654,483 | Ahlijian | Oct. 6, 1953 |
| 2,731,150 | McCann | Jan. 17, 1956 |
| 2,731,152 | Redner | Jan. 17, 1956 |
| 2,875,901 | Bottum | Mar. 3, 1959 |